United States Patent
Nishimura et al.

(10) Patent No.: US 10,770,986 B2
(45) Date of Patent: Sep. 8, 2020

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Kazuki Nishimura, Chuo-ku (JP); Toshihide Nakano, Chuo-ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 16/607,523

(22) PCT Filed: Jun. 23, 2017

(86) PCT No.: PCT/JP2017/023169
§ 371 (c)(1),
(2) Date: Oct. 23, 2019

(87) PCT Pub. No.: WO2018/235257
PCT Pub. Date: Dec. 27, 2018

(65) Prior Publication Data
US 2020/0144929 A1 May 7, 2020

(51) Int. Cl.
*H02M 5/458* (2006.01)

(52) U.S. Cl.
CPC .................. *H02M 5/4585* (2013.01)

(58) Field of Classification Search
CPC ............. H02M 5/4585; H02M 5/458; H02M 2001/123; H02M 5/40; H02M 5/42
See application file for complete search history.

(56) References Cited

U.S. PATENT DOCUMENTS

2011/0051478 A1    3/2011  Sato et al.
2018/0076657 A1*   3/2018  Nishimura .............. H02J 9/062

FOREIGN PATENT DOCUMENTS

WO    WO 2010/095241 A1    8/2010

OTHER PUBLICATIONS

International Search Report dated Aug. 8, 2017 in PCT/JP2017/023169 filed on Jun. 23, 2017.

* cited by examiner

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

First to third-phase converters convert first to third-phase AC voltages into DC voltages, respectively. First to third DC positive buses and first to third DC negative buses are electrically connected to the first to third-phase converters. Fourth to sixth-phase inverters convert the DC voltages into fourth to sixth-phase AC voltages. The first to third-phase converters include diode rectifiers. First to third fuses are connected between an AC power supply and the first to third-phase converters, respectively. Fourth to sixth fuses are inserted into the first to third DC positive buses, respectively. Seventh to ninth fuses are inserted into the first to third DC negative buses, respectively.

5 Claims, 13 Drawing Sheets

POWER CONVERSION DEVICE

TECHNICAL FIELD

The present invention relates to a power conversion device.

BACKGROUND ART

A power conversion device applied to an uninterruptible power supply device and the like generally includes a converter for converting alternating current (AC) power from a commercial AC power supply into direct current (DC) power, and an inverter for converting the DC power into AC power having desired frequency and voltage.

For example, WO 2010/095241 (PTL 1) discloses an uninterruptible power supply device constituted of a power conversion device including three-level converters and three-level inverters. In the power conversion device, each of the three-level converters and the three-level inverters includes a plurality of semiconductor switching elements.

In the power conversion device described above, an overcurrent or an overvoltage may occur when any of the plurality of semiconductor switching elements is damaged and is short-circuited. In PTL 1, a fuse is connected between one terminal of each semiconductor switching element and a DC bus (a DC positive bus, a DC negative bus, or DC neutral point bus). With such a configuration, when any of the plurality of semiconductor switching elements is short-circuited, a fuse is blown and a path through which a current flows is cut off, and thereby occurrence of an overcurrent or an overvoltage can be prevented.

CITATION LIST

Patent Literature

PTL 1: WO 2010/095241

SUMMARY OF INVENTION

Technical Problem

However, the power conversion device described in PTL 1 includes many fuses because a fuse is provided in a current path between each semiconductor switching element and a DC bus. Specifically, in PTL 1, nine fuses are used for the three-level converters and another nine fuses are used for the three-level inverters, and thus a total of 18 fuses are used, which may lead to an increase in the size and cost of the device.

Further, in PTL 1, since the power conversion device includes many fuses, the total power losses occurring in all the fuses increase during operation of the power conversion device, which may result in a reduction in the efficiency of the power conversion device.

Accordingly, an object of the present invention is to provide a power conversion device capable of achieving prevention of an overcurrent and an overvoltage with a simple configuration.

Solution to Problem

A power conversion device in accordance with an aspect of the present invention is configured to convert first to third-phase AC voltages supplied from an AC power supply into fourth to sixth-phase AC voltages and supply the fourth to sixth-phase AC voltages to a load. The power conversion device includes first to third-phase converters, first to third DC positive buses, first to third DC negative buses, and fourth to sixth-phase inverters. The first to third-phase converters are configured to convert the first to third-phase AC voltages into DC voltages, respectively. The first to third DC positive buses are electrically connected to the first to third-phase converters, respectively, and the first to third DC negative buses are electrically connected to the first to third-phase converters, respectively. The fourth-phase inverter is connected between the first DC positive bus and the first DC negative bus, and is configured to convert the DC voltage into the fourth-phase AC voltage. The fifth-phase inverter is connected between the second DC positive bus and the second DC negative bus, and is configured to convert the DC voltage into the fifth-phase AC voltage. The sixth-phase inverter is connected between the third DC positive bus and the third DC negative bus, and is configured to convert the DC voltage into the sixth-phase AC voltage. The first to third-phase converters include diode rectifiers. The power conversion device further includes first to ninth fuses. The first fuse is connected between the AC power supply and the first-phase converter. The second fuse is connected between the AC power supply and the second-phase converter. The third fuse is connected between the AC power supply and the third-phase converter. The fourth to sixth fuses are inserted into the first to third DC positive buses, respectively. The seventh to ninth fuses are inserted into the first to third DC negative buses, respectively.

Advantageous Effects of Invention

According to the present invention, a power conversion device capable of achieving prevention of an overcurrent and an overvoltage with a simple configuration can be provided.

DESCRIPTION OF EMBODIMENTS

Figure 1:
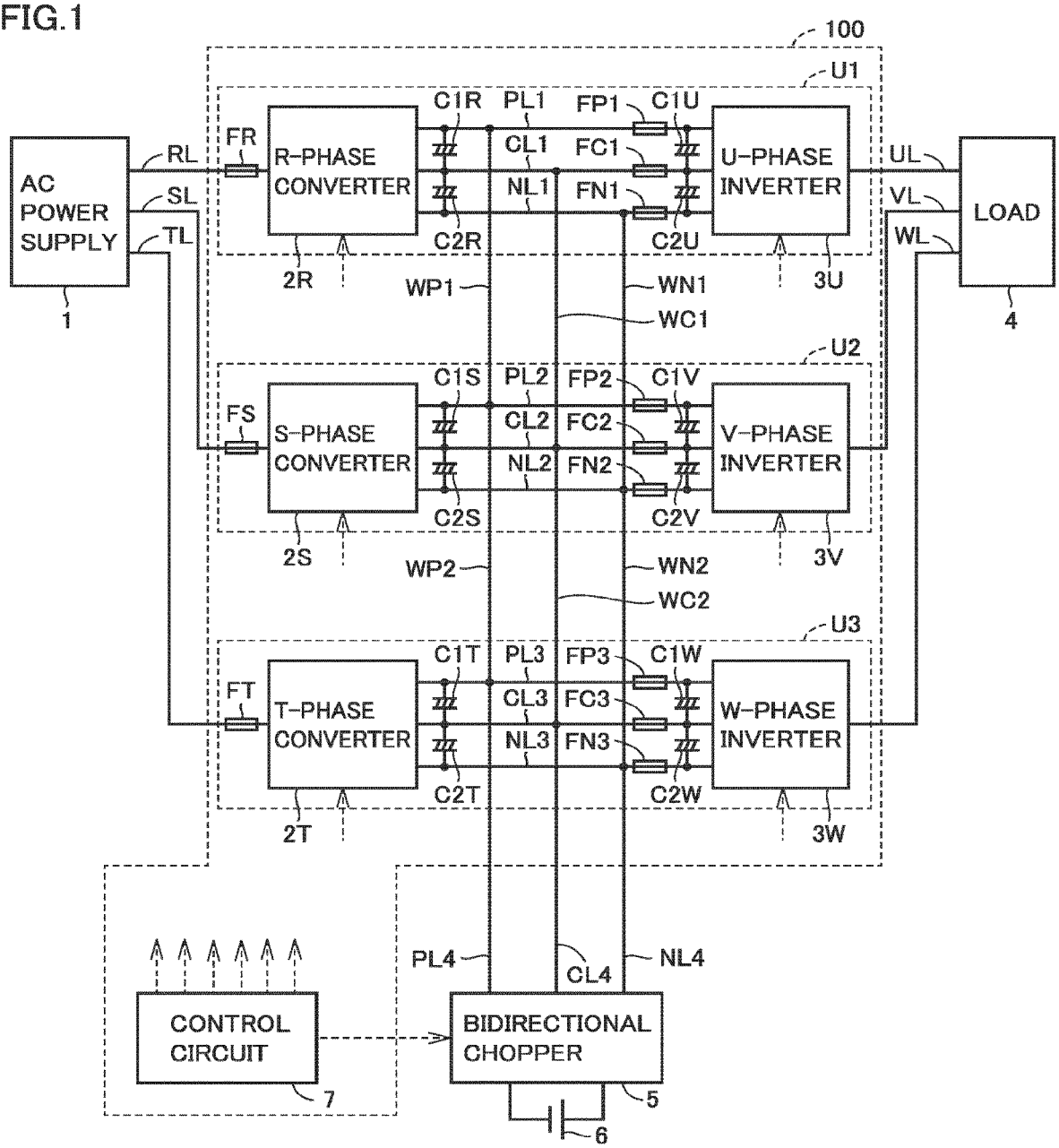
FIG. 1 is a schematic block diagram showing a main circuit configuration of a power conversion device in accordance with a first embodiment of the present invention.

Hereinafter, an embodiment of the present invention will be described in detail with reference to the drawings. It should be noted that identical or corresponding parts in the drawings will be designated by the same reference characters, and the description thereof will not be repeated in principle.

First Embodiment

FIG. 1 is a schematic block diagram showing a main circuit configuration of a power conversion device 100 in accordance with a first embodiment of the present invention. Power conversion device 100 in accordance with the first embodiment of the present invention is applied, for example, to an uninterruptible power supply device. An AC power supply 1 supplies three-phase AC power having a commercial frequency to power conversion device 100. A load 4 is driven by three-phase AC power having the commercial frequency supplied from power conversion device 100.

Referring to FIG. 1, power conversion device 100 includes three converter units U1 to U3 connected in parallel between AC power supply 1 and load 4. Power conversion device 100 further includes wires WP1, WP2, WN1, WN2, WC1, and WC2, and a control circuit 7. Further, power conversion device 100 constitutes an uninterruptible power supply device, by being connected with a DC positive bus PL4, a DC negative bus NL4, a DC neutral point bus CL4, a bidirectional chopper 5, and a DC power supply 6.

First converter unit U1 includes an R-phase converter 2R, a U-phase inverter 3U, a DC positive bus PL1, a DC negative bus NL1, a DC neutral point bus CL1, and capacitors C1R, C2R, C1U, and C2U.

To R-phase converter 2R, an R-phase voltage VR is supplied from AC power supply 1 through an R-phase line RL. R-phase converter 2R converts R-phase voltage VR into a DC voltage, and supplies the DC voltage to U-phase inverter 3U through DC buses PL1, CL1, NL1. U-phase inverter 3U converts the DC voltage from R-phase converter 2R into a U-phase voltage VU. U-phase voltage VU generated by U-phase inverter 3U is supplied to load 4 through a U-phase line UL. Capacitors C1R and C1U are connected in parallel between DC positive bus PL1 and DC neutral point bus CL1. Capacitors C2R and C2U are connected in parallel between DC neutral point bus CL1 and DC negative bus NL1.

Second converter unit U2 includes an S-phase converter 2S, a V-phase inverter 3V, a DC positive bus PL2, a DC negative bus NL2, a DC neutral point bus CL2, and capacitors C1S, C2S, C1V, and C2V.

To S-phase converter 2S, an S-phase voltage VS is supplied from AC power supply 1 through an S-phase line SL. S-phase converter 2S converts S-phase voltage VS into a DC voltage, and supplies the DC voltage to V-phase inverter 3V through DC buses PL2, CL2, NL2. V-phase inverter 3V converts the DC voltage from S-phase converter 2S into a V-phase voltage VV. V-phase voltage VV generated by V-phase inverter 3V is supplied to load 4 through a V-phase line VL. Capacitors C1S and C1V are connected in parallel between DC positive bus PL2 and DC neutral point bus CL2. Capacitor C2S and C2V are connected in parallel between DC neutral point bus CL2 and DC negative bus NL2.

Third converter unit U3 includes a T-phase converter 2T, a W-phase inverter 3W, a DC positive bus PL3, a DC negative bus NL3, a DC neutral point bus CL3, and capacitors C1T, C2T, C1W, and C2W.

To T-phase converter 2T, a T-phase voltage VT is supplied from AC power supply 1 through a T-phase line TL. T-phase converter 2T converts T-phase voltage VT into a DC voltage, and supplies the DC voltage to W-phase inverter 3W through DC buses PL3, CL3, NL3. W-phase inverter 3W converts the DC voltage from T-phase converter 2T into a W-phase voltage VW. W-phase voltage VW generated by W-phase inverter 3W is supplied to load 4 through a W-phase line WL. Capacitors C1T and C1W are connected in parallel between DC positive bus PL3 and DC neutral point bus CL3. Capacitors C2T and C2W are connected in parallel between DC neutral point bus CL3 and DC negative bus NL3.

In this manner, each of converter units U1 to U3 is configured to include one single-phase converter, one single-phase inverter, three DC buses (a DC positive bus, a DC negative bus, a DC neutral point bus), and four capacitors.

Wires WP1, WN1, and WC1 are provided between first converter unit U1 and second converter unit U2. Specifically, wire WP1 is connected between DC positive buses PL1 and PL2. Wire WN1 is connected between DC negative buses NL1 and NL2. Wire WC1 is connected between DC neutral point buses CL1 and CL2.

Wires WP2, WN2, and WC2 are provided between second converter unit U2 and third converter unit U3. Specifically, wire WP2 is connected between DC positive buses PL2 and PL3. Wire WN2 is connected between DC negative buses NL2 and NL3. Wire WC2 is connected between DC neutral point buses CL2 and CL3.

DC positive bus PL4, DC negative bus NL4, and DC neutral point bus CL4 are provided between third converter unit U3 and bidirectional chopper 5. Specifically, DC positive bus PL4, DC negative bus NL4, and DC neutral point bus CL4 are connected between bidirectional chopper 5 and DC positive bus PL3, DC negative bus NL3, and DC neutral point bus CL3, respectively.

Bidirectional chopper 5 is connected between DC power supply 6 and each of DC positive bus PL4, DC negative bus NL4, and DC neutral point bus CL4. Bidirectional chopper 5 is configured to perform bidirectional DC voltage conversion between DC power supply 6 and each of DC buses PL4, NL4, and CL4.

DC positive buses PL1, PL2, and PL3 are connected with each other through wires WP1 and WP2. Thereby, voltages of DC positive buses PL1, PL2, and PL3 can be matched.

Further, DC negative buses NL1, NL2, and NL3 are connected with each other through wires WN1 and WN2. Thereby, voltages of DC negative buses NL1, NL2, and NL3 can be matched.

Furthermore, DC neutral point buses CL1, CL2, and CL3 are connected with each other through wires WC1 and WC2. Thereby, voltages of DC neutral point buses CL1, CL2, and CL3 can be matched.

With such a configuration, input voltages of single-phase inverters 3U, 3V, and 3W of converter units U1 to U3 can be matched. Therefore, amplitudes of the phase voltages output from single-phase inverters 3U, 3V, and 3W can be matched.

Next, operation of power conversion device 100 in accordance with the first embodiment will be described.

The three-phase AC power from AC power supply 1 is supplied to R-phase converter 2R, S-phase converter 2S, and T-phase converter 2T, through R-phase line RL, S-phase line SL, and T-phase line TL, respectively. R-phase converter 2R, S-phase converter 2S, and T-phase converter 2T constitute a three-phase converter. The three-phase converter converts the three-phase AC power supplied from AC power supply 1 into DC power, and supplies the DC power to U-phase inverter 3U, V-phase inverter 3V, and W-phase inverter 3W, through the DC positive buses, the DC negative buses, and the DC neutral point buses. U-phase inverter 3U, V-phase inverter 3V, and W-phase inverter 3W constitute a three-phase inverter. The three-phase inverter converts the DC power supplied through the DC positive buses, the DC negative buses, and the DC neutral point buses into three-phase AC power. The three-phase AC power generated by the three-phase inverter is supplied to load 4 through U-phase line UL, V-phase line VL, and W-phase line WL.

During a normal state in which the three-phase AC power is supplied from AC power supply 1, bidirectional chopper 5 charges DC power supply 6 by stepping down each of a DC voltage between DC buses PL4 and CL4 and a DC voltage between DC buses CL4 and NL4 and supplying them to DC power supply 6. During a power failure in which supply of a three-phase AC voltage from AC power supply 1 is cut off, bidirectional chopper 5 discharges DC power supply 6 by stepping up a voltage between terminals of DC power supply 6 and supplying it to each of between DC buses PL4 and CL4 and between DC buses CL4 and NL4.

Control circuit 7 controls operations of the three-phase converter (single-phase converters 2R, 2S, and 2T), the three-phase inverter (single-phase inverters 3U, 3V, and 3W), and bidirectional chopper 5, based on the three-phase AC voltage supplied from AC power supply 1, a DC voltage of each of DC buses PL4, NL4, and CL4, the voltage between the terminals of DC power supply 6, a three-phase AC voltage output from the three-phase inverter (single-phase inverters 3U, 3V, and 3W), a three-phase AC current flowing to load 4 (a load current), and the like.

Power conversion device 100 further includes fuses FR, FS, FT, FP1, FP2, FP3, FN1, FN2, FN3, FC1, FC2, and FC3.

Fuse FR is inserted into R-phase line RL, and is blown when an overcurrent flows through R-phase line RL. Fuse FS is inserted into S-phase line SL, and is blown when an overcurrent flows through S-phase line SL. Fuse FT is inserted into T-phase line TL, and is blown when an overcurrent flows through T-phase line TL.

Fuse FP1 is inserted into DC positive bus PL1, and is blown when an overcurrent flows through DC positive bus PL1. Fuse FN1 is inserted into DC negative bus NL1, and is blown when an overcurrent flows through DC negative bus NL1. Fuse FC1 is inserted into DC neutral point bus CL1, and is blown when an overcurrent flows through DC neutral point bus CL1.

Fuse FP2 is inserted into DC positive bus PL2, and is blown when an overcurrent flows through DC positive bus PL2. Fuse FN2 is inserted into DC negative bus NL2, and is blown when an overcurrent flows through DC negative bus NL2. Fuse FC2 is inserted into DC neutral point bus CL2, and is blown when an overcurrent flows through DC neutral point bus CL2.

Fuse FP3 is inserted into DC positive bus PL3, and is blown when an overcurrent flows through DC positive bus PL3. Fuse FN3 is inserted into DC negative bus NL3, and is blown when an overcurrent flows through DC negative bus NL3. Fuse FC3 is inserted into DC neutral point bus CL3, and is blown when an overcurrent flows through DC neutral point bus CL3.

It should be noted that, in the present specification, fuses FR, FS, and FT inserted into phase lines RL, SL, and TL supplying the AC power to single-phase converters 2R, 2S, and 2T, respectively, are also referred to as "AC fuses". In addition, fuses FP1, FN1, FC1, FP2, FN2, FC2, FP3, FN3, and FC3 inserted into DC buses PL1, NL1, CL1, PL2, NL2, CL2, PL3, NL3, and CL3, respectively, are also referred to as "DC fuses".

Figure 2:
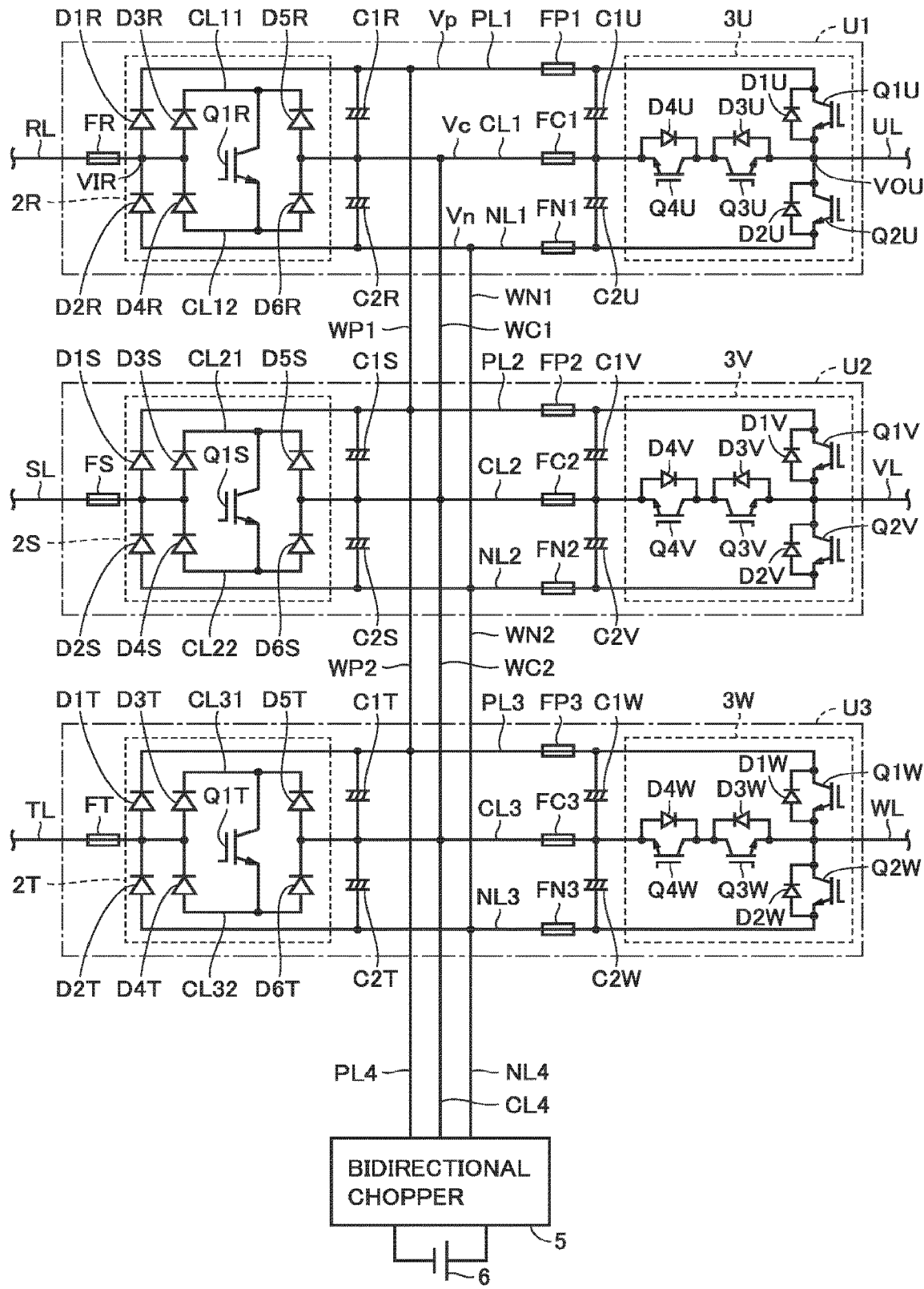
FIG. 2 is a circuit diagram illustrating in detail configurations of single-phase converters and single-phase inverters shown in FIG. 1.

FIG. 2 is a circuit diagram illustrating in detail configurations of single-phase converters 2R, 2S, and 2T and single-phase inverters 3U, 3V, and 3W shown in FIG. 1.

Referring to FIG. 2, R-phase converter 2R includes an IGBT element Q1R and diodes D1R to D6R. S-phase converter 2S includes an IGBT element Q1S and diodes D1S to D6S. T-phase converter 2T includes an IGBT element Q1T and diodes D1T to D6T. U-phase inverter 3U includes IGBT elements Q1U to Q4U and diodes D1U to D4U. V-phase inverter 3V includes IGBT elements Q1V to Q4V and diodes D1V to D4V. W-phase inverter 3W includes IGBT elements Q1W to Q4W and diodes D1W to D4W. It should be noted that, although an IGBT element is used as a switching element in FIG. 2, the switching element is not limited thereto, and another switching element such as a MOS-FET, for example, may be used.

Here, in order to collectively describe the configuration of single-phase converters 2R, 2S, and 2T, reference characters R, S, and T will also be collectively designated by a reference character "x". In order to collectively describe the configuration of single-phase inverters 3U, 3V, and 3W, reference characters U, V, and W will be collectively designated by a reference character "y". DC positive buses PL1, PL2, and PL3 will be collectively designated by "PLi", DC negative buses NL1, NL2, and NL3 will be collectively designated by "NLi", and DC neutral point buses CL1, CL2, and CL3 will be collectively designated by "CLi".

Each of single-phase converters 2R, 2S, and 2T is constituted of a diode rectifier having a neutral point, called "Vienna Rectifier". A single-phase converter 2x includes diodes D1x and D2x, a bridge circuit composed of diodes D3x to D6x, and an IGBT element Q1x. Diode D1x has a cathode connected to a DC positive bus PLi, and an anode connected to an x-phase line xL. Diode D2x has a cathode connected to x-phase line xL, and an anode connected to a DC negative bus NLi. In a diode bridge, an anode of diode D3x and a cathode of diode D4x are connected to x-phase line xL, and an anode of diode D5x and a cathode of diode D6x are connected to a DC neutral point bus CLi. IGBT element Q1x has an emitter connected to a cathode of diode D3x and a cathode of diode D5x, and a collector connected to an anode of diode D4x and an anode of diode D6x.

In each of single-phase inverters 3U, 3V, and 3W, an IGBT element Q1y has an emitter connected to a y-phase line yL, and a collector connected to DC positive bus PLi. An IGBT element Q2y has a collector connected to y-phase line yL, and an emitter connected to DC negative bus NLi. An IGBT element Q3y has an emitter connected to y-phase line yL, and a collector connected to a collector of an IGBT element Q4y. IGBT element Q4y has an emitter connected to DC neutral point bus CLi. Diodes D1y and D2y function as reflux diodes, and diodes D3y and D4y function as clamp diodes. IGBT elements Q3y and Q4y and diodes D3y and D4y constitute an AC switch.

Figure 3:
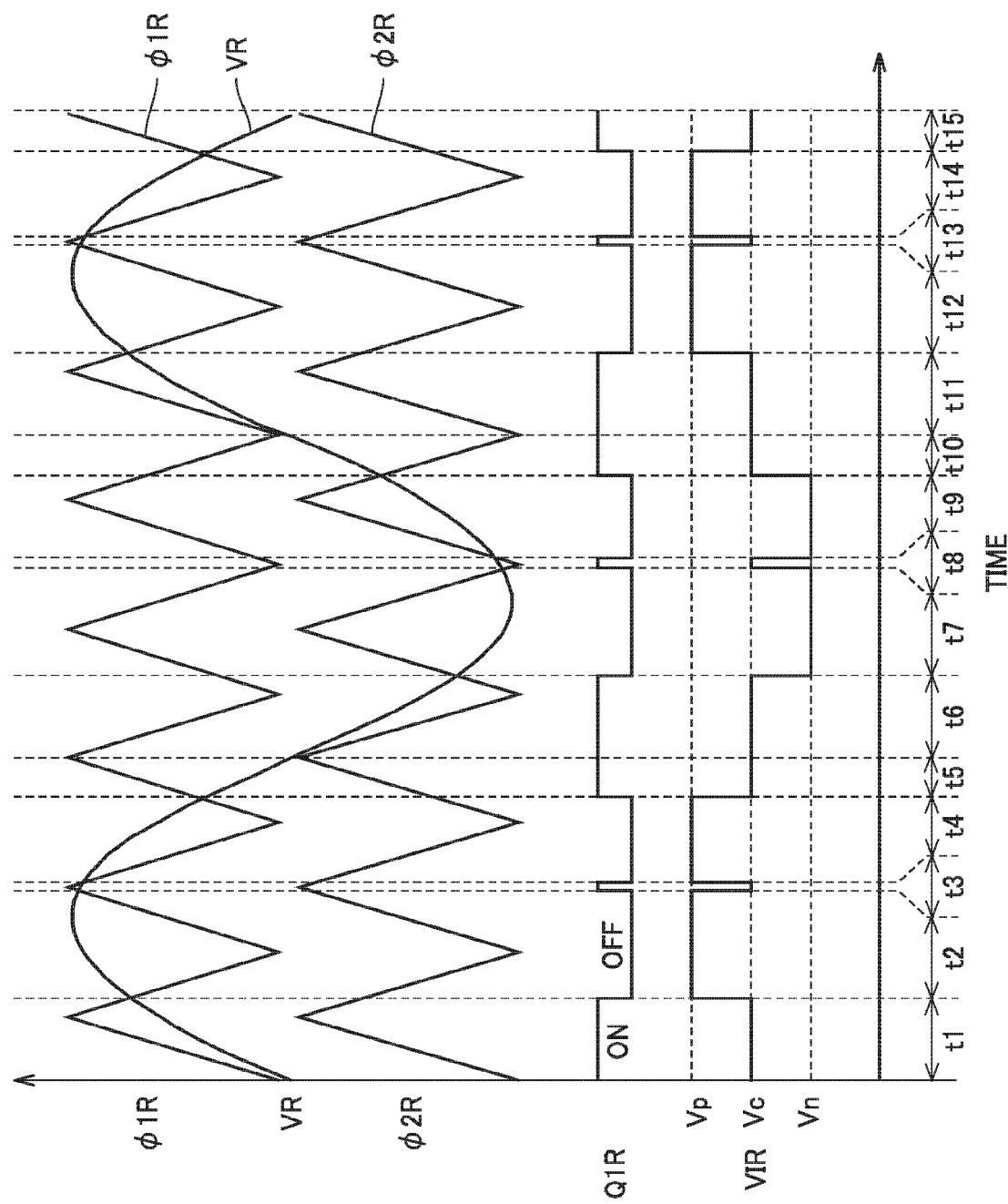
FIG. 3 is a waveform diagram for illustrating timing of ON/OFF of an IGBT element of a single-phase converter shown in FIG. 2.
Figure 4:
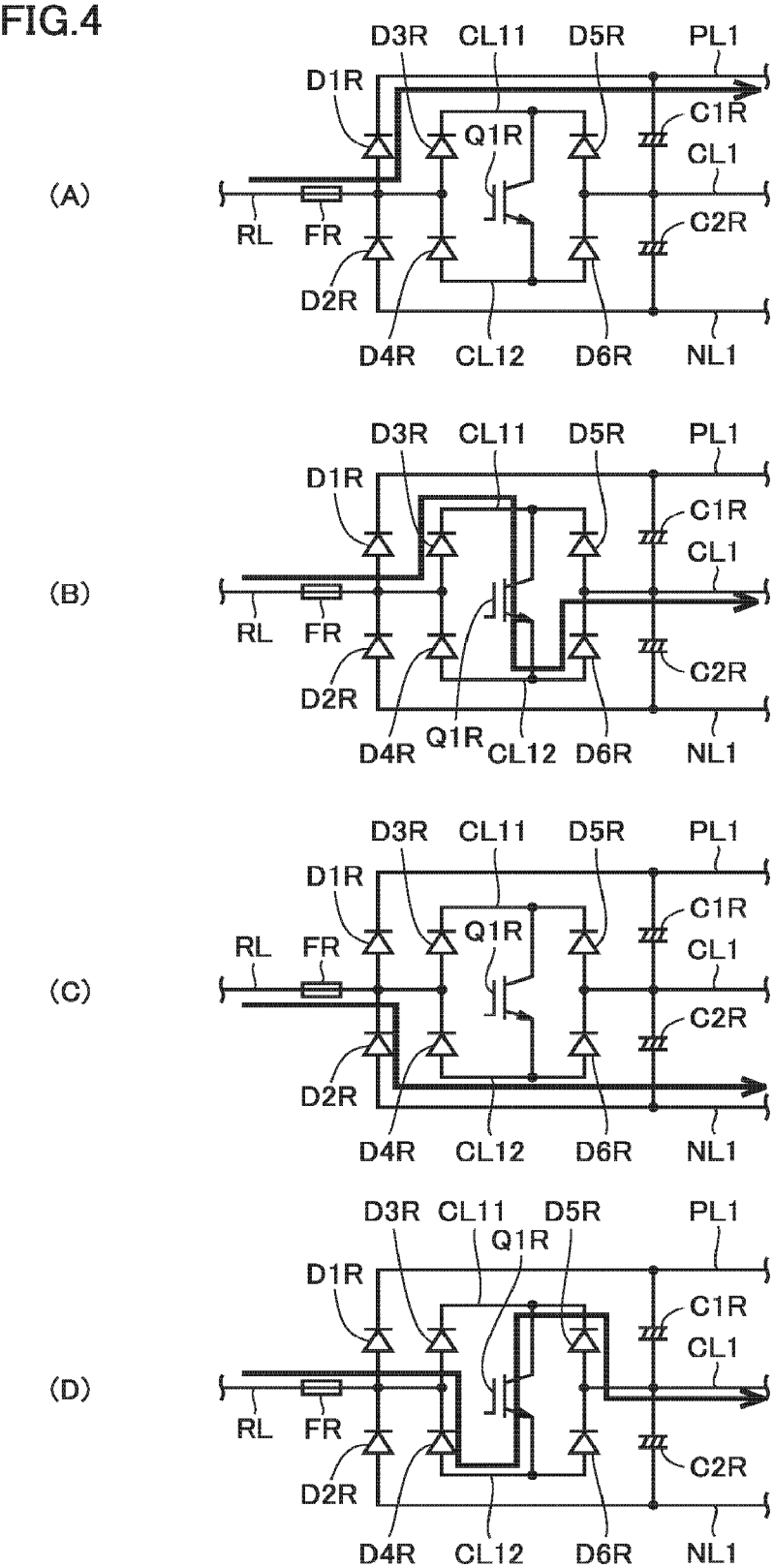
FIG. 4 is a circuit diagram showing operation of a single-phase converter shown in FIG. 2.

Next, operation of single-phase converters 2R, 2S, and 2T will be described using FIGS. 3 and 4. FIG. 3 is a waveform diagram showing the relation between R-phase voltage VR and ON/OFF of IGBT element Q1R. FIG. 4 is a circuit diagram showing operation of a single-phase converter shown in FIG. 2.

Referring to FIG. 3, levels of R-phase voltage VR and reference signals ϕ1R and ϕ2R are compared, and combination of ON/OFF of IGBT element Q1R is determined based on the result of comparison.

Reference signals ϕ1R and ϕ2R are each a triangular wave signal which has a frequency five times that of R-phase voltage VR and is synchronized with R-phase voltage VR. Reference signal ϕ2R is a triangular wave signal in phase with reference signal ϕ1R.

As shown in FIG. 3, during periods in which the level of R-phase voltage VR is between the levels of reference signals ϕ1R and ϕ2R (t1, t3, t5, t6, t8, t10, t11, t13, t15), IGBT element Q1R is turned on. In this case, during periods in which R-phase voltage VR is a positive voltage (t1, t3, t5, t11, t13, t15), a current flows from R-phase line RL to DC neutral point bus CL1 through diode D3R, IGBT element Q1R, and diode D6R, as shown in FIG. 4(B). When a voltage of a connection point between R-phase line RL and R-phase converter 2R is defined as VIR and a potential of DC neutral point bus CL1 is defined as Vc, voltage VIR is equal to Vc (see FIG. 3). On the other hand, during periods in which R-phase voltage VR is a negative voltage (t6, t8, t10), a current flows from DC neutral point bus CL1 to R-phase line RL through diode D5R, IGBT element Q1R, and diode D4R, as shown in FIG. 4(D). Voltage VIR is equal to Vc (see FIG. 3).

During periods in which R-phase voltage VR is positive and the level of R-phase voltage VR is higher than the levels of reference signals ϕ1R and ϕ2R (t2, t4, t12, t14), IGBT element Q1R is turned off. On this occasion, a current flows from R-phase line RL to DC positive bus PL1 through diode D1R, as shown in FIG. 4(A). When a potential of DC positive bus PL1 is defined as Vp, voltage VIR is equal to Vp (see FIG. 3).

During periods in which the level of R-phase voltage VR is lower than the levels of reference signals ϕ1R and ϕ2R (t7, t9), IGBT element Q1R is turned off. On this occasion, a current flows from DC negative bus NL1 to R-phase line RL through diode D2R, as shown in FIG. 4(C). When a potential of DC negative bus NL1 is defined as Vn, voltage VIR is equal to Vn (see FIG. 3).

In this manner, R-phase converter 2R converts the R-phase voltage into a DC voltage. That is, R-phase converter 2R constitutes a diode rectifier having a neutral point. It should be noted that the S-phase circuit and the T-phase circuit also operate similarly to the R-phase circuit.

Next, function of fuses FR, FS, and FT provided on the single-phase converter 2R, 2S, 2T side in power conversion device 100 will be described.

Figure 5:
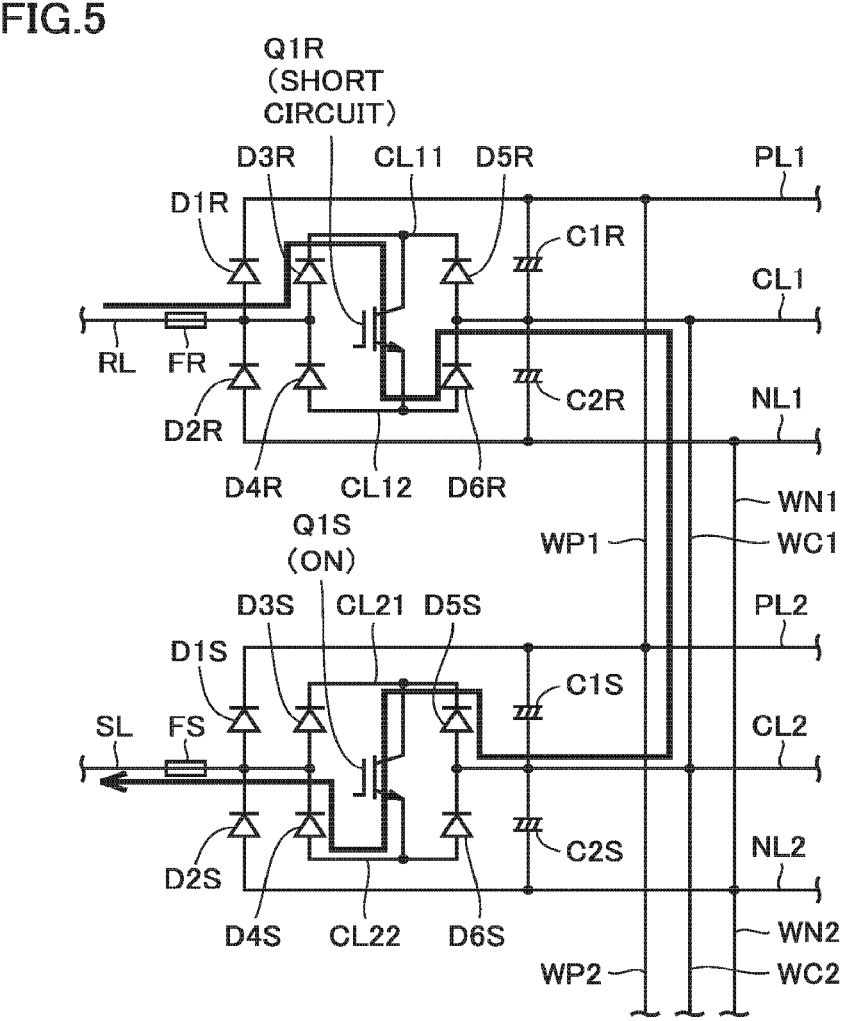
FIG. 5 is a circuit diagram showing function of AC fuses shown in FIG. 2.

FIG. 5 is a diagram showing a case where IGBT element Q1R has a failure and is short-circuited during a period in which IGBT element Q1S is turned on. In this case, a short-circuit current flows through a path from R-phase line RL to S-phase line SL through diode D3R, IGBT element Q1R, wire WC1, diode D5S, and IGBT element Q1S, as indicated by a solid line arrow in the drawing, and fuses FR and FS are blown. It should be noted that, although the description is given in FIG. 5 taking the R phase and the S phase as an example, the same applies to the T phase.

Next, operation of single-phase inverters 3U, 3V, and 3W will be described.

Figure 6:
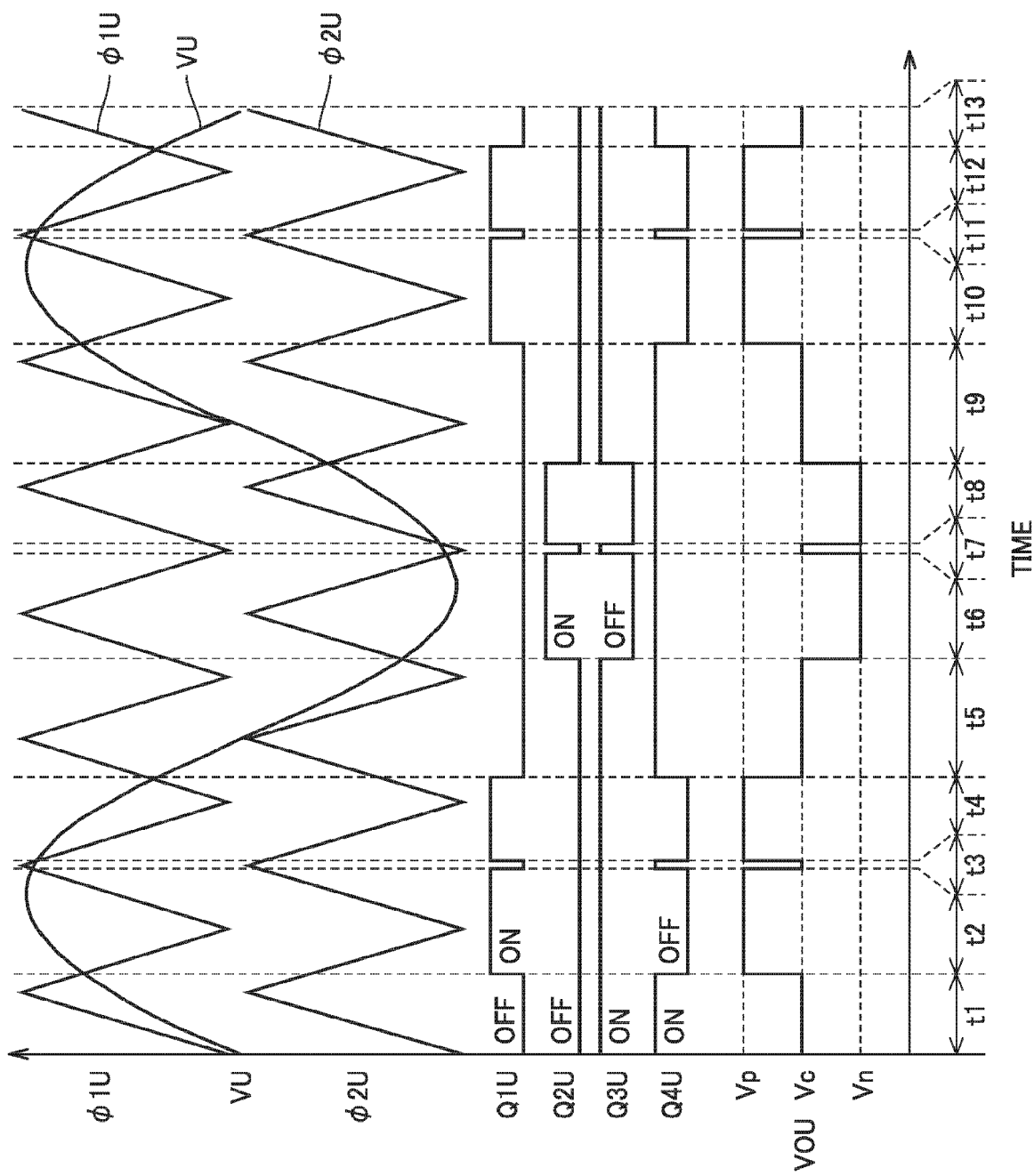
FIG. 6 is a waveform diagram for illustrating timing of ON/OFF of each of IGBT elements of a single-phase inverter shown in FIG. 2.

FIG. 6 is a waveform diagram showing the relation between U-phase voltage VU and ON/OFF of IGBT elements Q1U to Q4U. U-phase voltage VU is a target voltage of the voltage output from the U-phase line, calculated in control circuit 7 based on the power input from AC power supply 1 to power conversion device 100. Levels of U-phase voltage VU and reference signals ϕ1U and ϕ2U are compared, and combination of ON/OFF of each of IGBT elements Q1U to Q4U is determined based on the result of comparison. As a result, when a voltage of a connection point between U-phase line UL and U-phase inverter 3U is defined as VOU and potentials of DC buses PL1, CL1, and NL1 are defined as Vp, Vc, and Vn (see FIG. 2), voltage VOU is determined as any of voltages Vp, Vc, and Vn.

Reference signals ϕ1U and ϕ2U are each a triangular wave signal which has a frequency five times that of U-phase voltage VU and is synchronized with U-phase voltage VU. Reference signal ϕ2U is a triangular wave signal in phase with reference signal ϕ1U.

As shown in FIG. 6, during periods in which the level of U-phase voltage VU is between the levels of reference signals ϕ1U and ϕ2U (t1, t3, t5, t7, t9, t11, t13), IGBT elements Q3U and Q4U are turned on, and IGBT elements Q1U and Q2U are turned off. Thus, the potential of DC neutral point bus CL1 is output from capacitors C1U and C2U to U-phase line UL through IGBT elements Q3U and Q4U. That is, VOU is equal to Vc.

During periods in which the level of U-phase voltage VU is higher than the levels of reference signals ϕ1U and ϕ2U (t2, t4, t10, t12), IGBT elements Q1U and Q3U are turned on, and IGBT elements Q2U and Q4U are turned off. Thus, the potential of DC positive bus PL1 is output from capacitor C1U to U-phase line UL through IGBT element Q1U. That is, VOU is equal to Vp.

During periods in which the level of U-phase voltage VU is lower than the levels of reference signals ϕ1U and ϕ2U (t6, t8), IGBT elements Q2U and Q4U are turned on, and IGBT elements Q1U and Q3U are turned off. Thus, the potential of DC negative bus NL1 is output from capacitor C2U to U-phase line UL through IGBT element Q2U. That is, VOU is equal to Vn.

It should be noted that, although operation of U-phase inverter 3U is described herein, V-phase inverter 3V and W-phase inverter 3W also operate similarly to U-phase inverter 3U.

Next, function of fuses FP1, FP2, FP3, FN1, FN2, FN3, FC1, FC2, and FC3 provided on the single-phase inverter 3U, 3V, 3W side in power conversion device 100 will be described.

Figure 7:
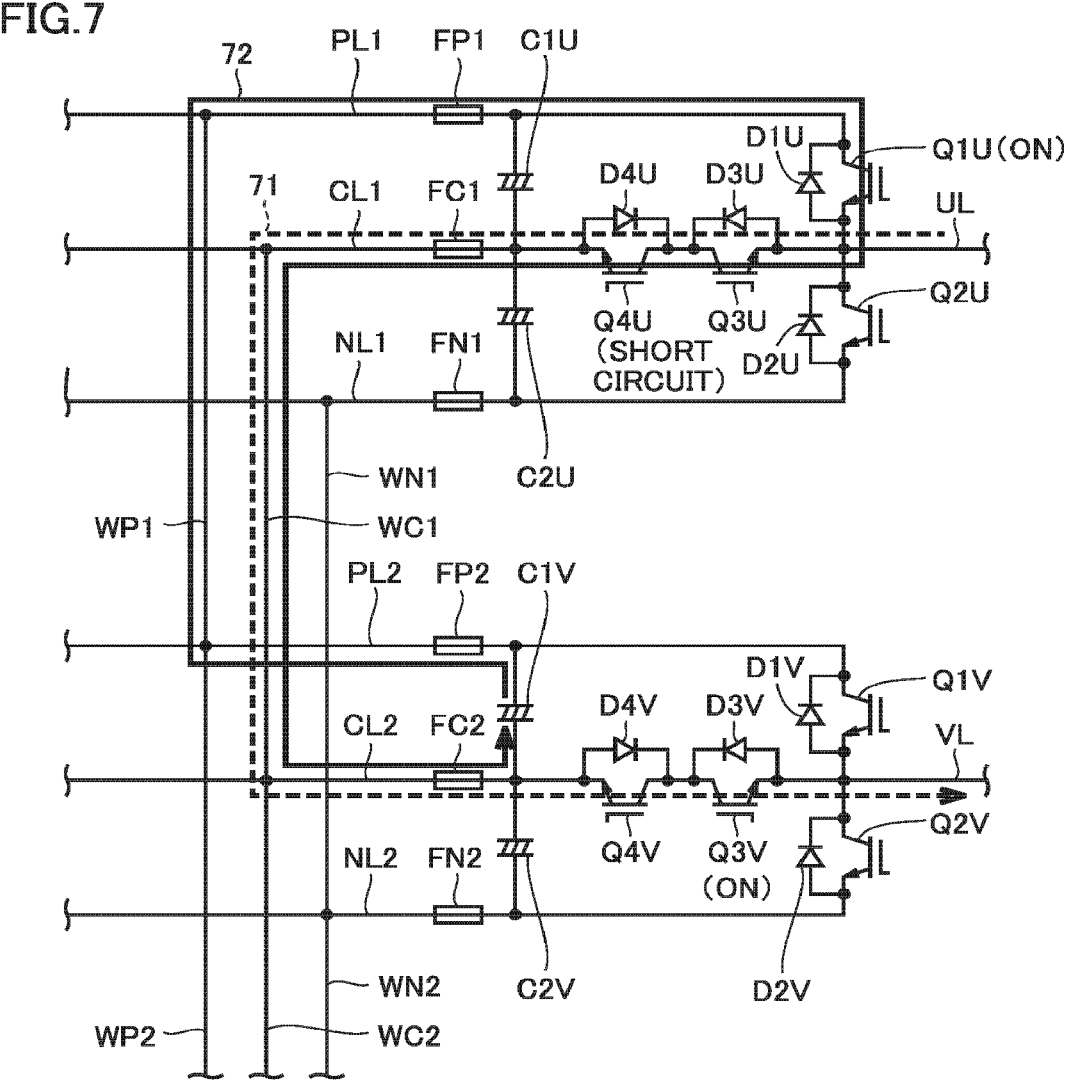
FIG. 7 is a circuit diagram showing function of DC fuses shown in FIG. 2.

FIG. 7 is a diagram showing a case where IGBT element Q4U has a failure and is short-circuited during a period in which IGBT elements Q1U and Q3V are turned on. In this case, a short-circuit current flows through a path from U-phase line UL to V-phase line VL through diode D3U, IGBT element Q4U, wire WC1, diode D4V, and IGBT element Q3V, as indicated by a broken line arrow 71 in the drawing, and fuses FC1 and FC2 are blown. Further, a short-circuit current flows through a path from a positive-side electrode of capacitor C1V to a negative-side electrode of capacitor C1V through wire WP1, IGBT element Q1U, diode D3U, IGBT element Q4U, and wire WC1, as indicated by a solid line arrow 72 in the drawing, and fuses FP2, FP1, FC1, and FC2 are blown.

Figure 8:
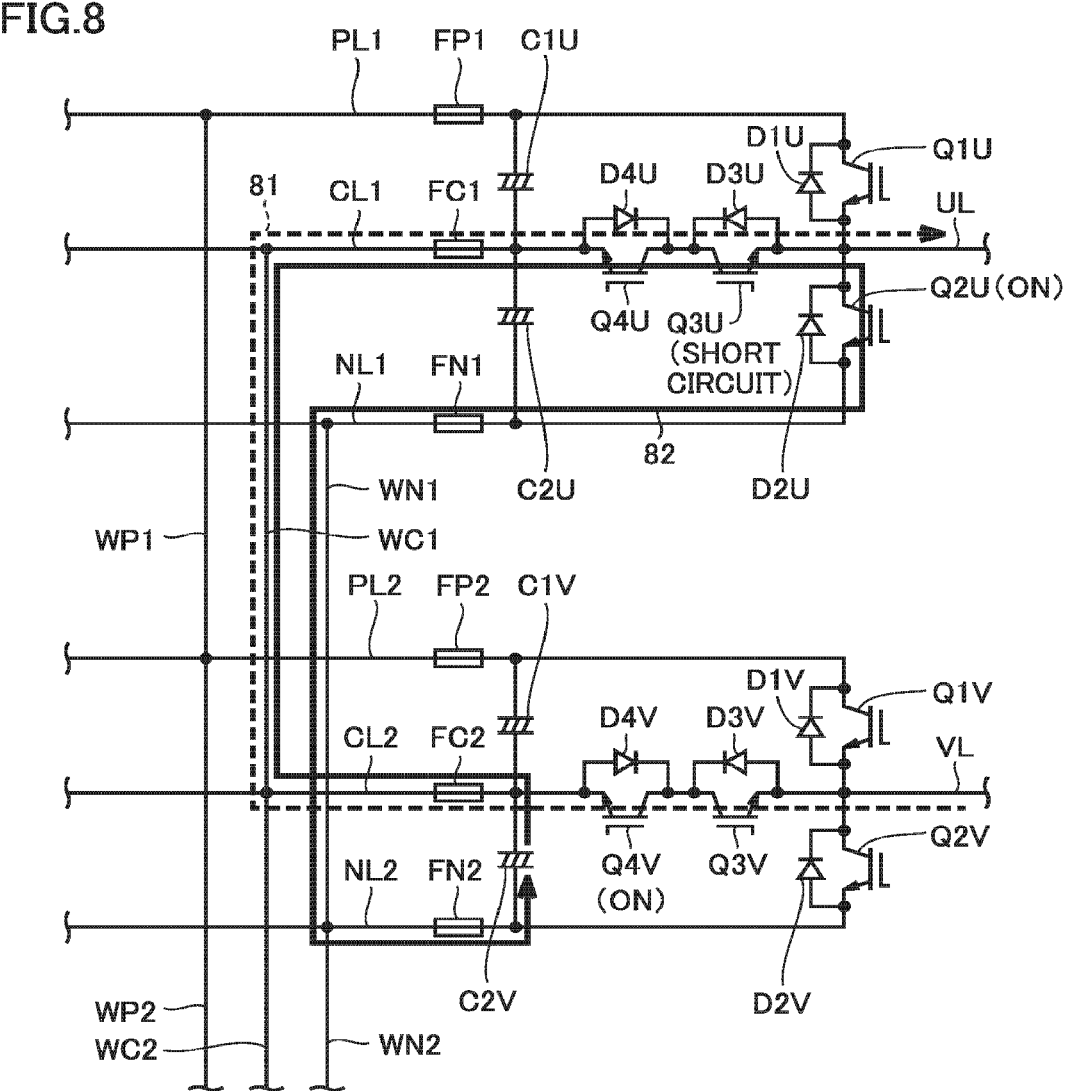
FIG. 8 is a circuit diagram showing function of the DC fuses shown in FIG. 2.

FIG. 8 is a diagram showing a case where IGBT element Q3U has a failure and is short-circuited during a period in which IGBT elements Q2U and Q4V are turned on. In this case, a short-circuit current flows through a path from V-phase line VL to U-phase line UL through diode D3V, IGBT element Q4V, wire WC1, diode D4U, and IGBT element Q3U, as indicated by a broken line arrow 81 in the drawing, and fuses FC2 and FC1 are blown. Further, a short-circuit current flows through a path from a positive-side electrode of capacitor C2V to a negative-side electrode of capacitor C2V through wire WC1, diode D4U, IGBT element Q3U, IGBT element Q2U, and wire WN1, as indicated by a solid line arrow 82, and fuses FC2, FC1, FN1, and FN2 are blown.

Figure 9:
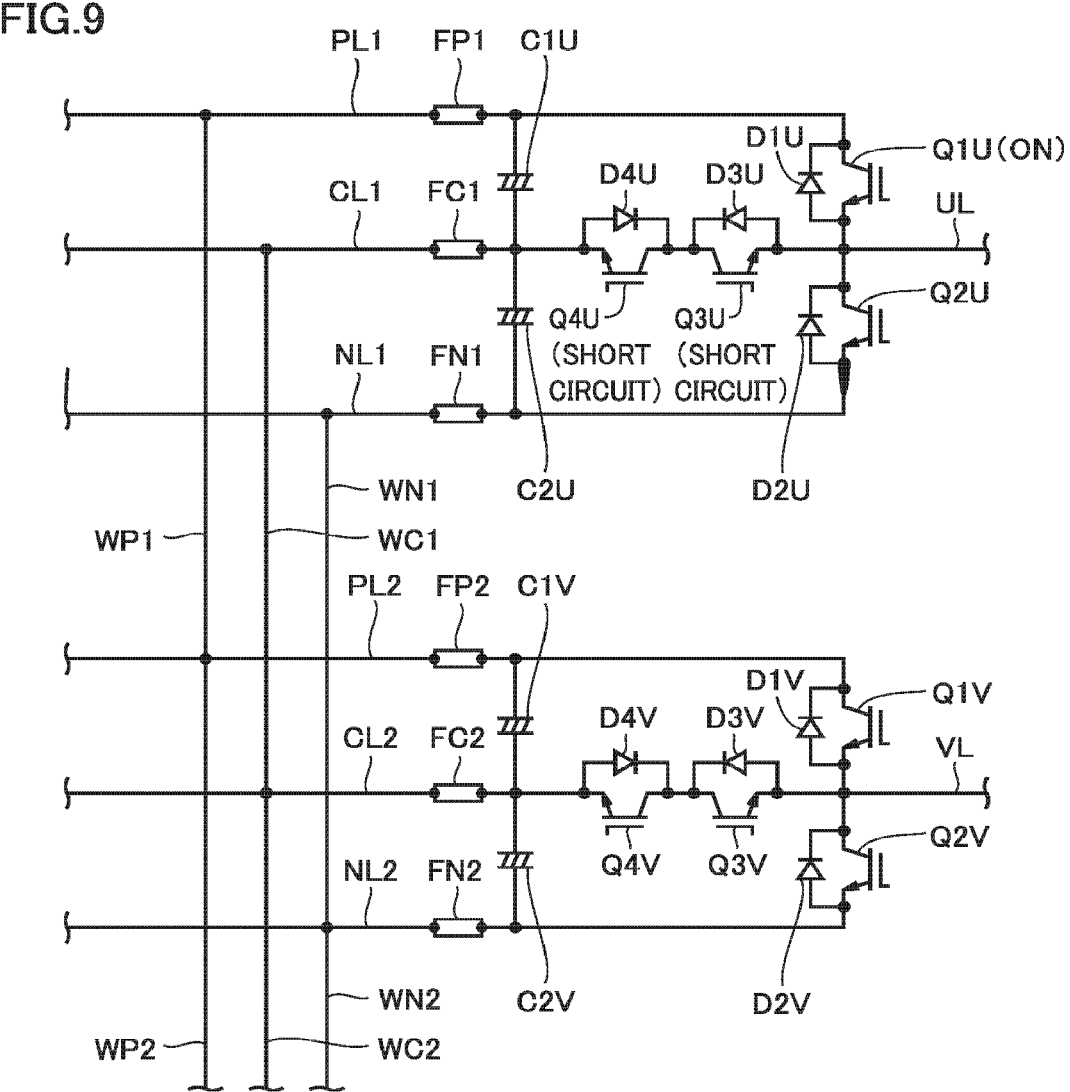
FIG. 9 is a circuit diagram showing function of the DC fuses shown in FIG. 2.

FIG. 9 is a diagram showing a case where IGBT elements Q3U and Q4U have a failure and are short-circuited. Since fuses FP1, FC1, FN1, FP2, FC2, and FN2 are blown as shown in FIGS. 7 and 8, the U phase is completely separated from the V phase. This can prevent flowing of an overcurrent and occurrence of an overvoltage. It should be noted that, although the description is given in FIGS. 7 to 9 taking the U phase and the V phase as an example, the same applies to the W phase.

[Function and Effect of First Embodiment]

Next, the function and effect of the power conversion device in accordance with the first embodiment will be described in comparison with a power conversion device in accordance with a comparative example.

Figure 10:
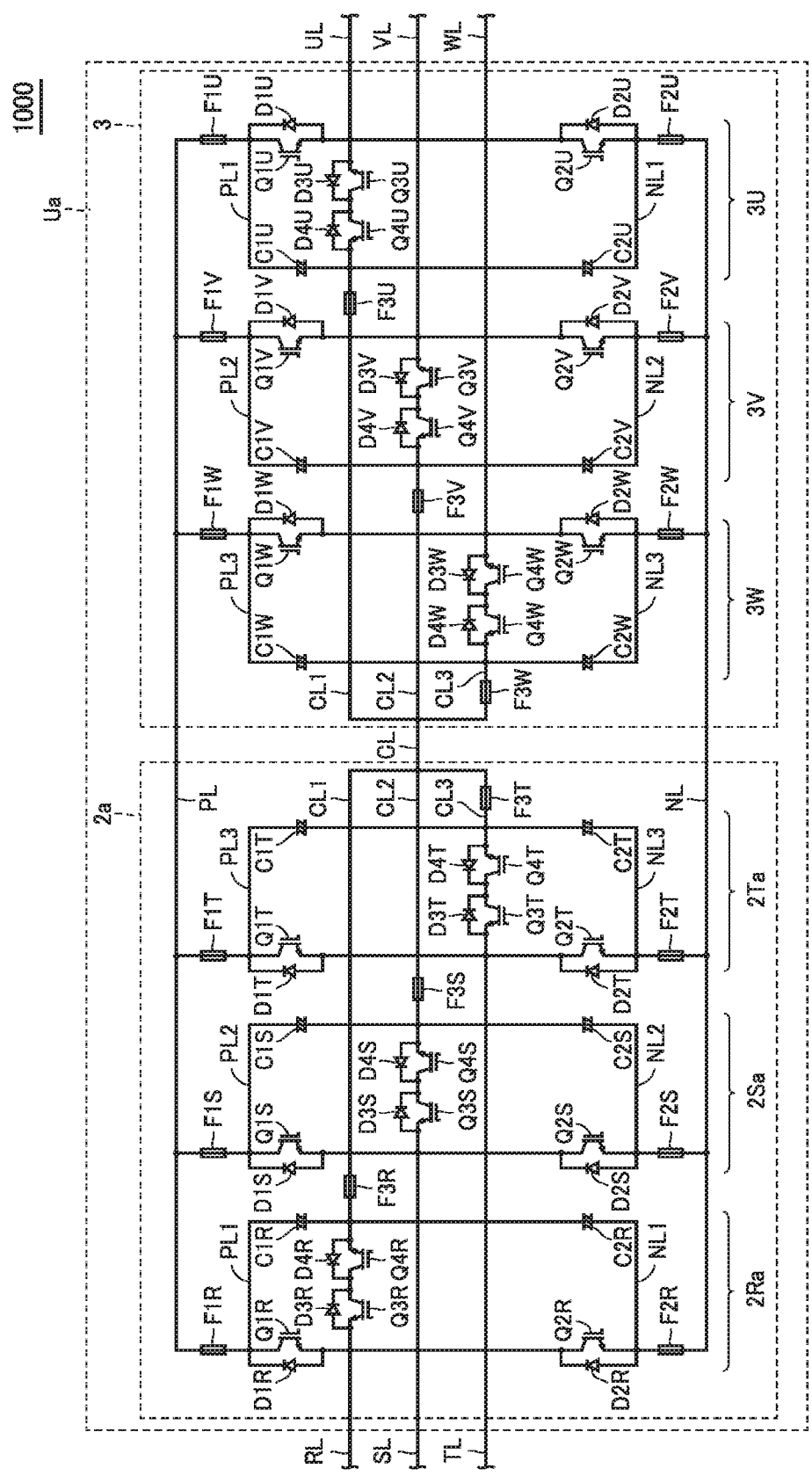
FIG. 10 is a circuit diagram illustrating a configuration of a power conversion device in accordance with a comparative example.

FIG. 10 is a circuit diagram illustrating a configuration of a power conversion device 1000 in accordance with a comparative example. Power conversion device 1000 in accordance with the comparative example corresponds to the power conversion device described in PTL 1 described above. Power conversion device 1000 in accordance with the comparative example is the same as power conversion device 100 in accordance with the first embodiment shown in FIG. 1 in the basic structure constituted of converters and inverters, and is different therefrom in the main circuit configuration of the converters and the configuration of a converter unit.

Referring to FIG. 10, power conversion device 1000 in accordance with the comparative example includes one converter unit Ua connected between AC power supply 1 and load 4 (both not shown). Converter unit Ua includes a three-phase converter 2a, a three-phase inverter 3, a DC positive bus PL, a DC negative bus NL, and a DC neutral point bus CL.

Three-phase converter 2a is configured by connecting an R-phase converter 2Ra, an S-phase converter 2Sa, and a T-phase converter 2Ta in parallel between DC positive bus PL and DC negative bus NL. Single-phase converters 2Ra, 2Sa, and 2Ta are configured to have an input/output relation opposite to that of single-phase inverters 3U, 3V, and 3W of power conversion device 100 in accordance with the first embodiment. The details thereof will be described below.

Referring to FIG. 10, R-phase converter 2Ra includes IGBT elements Q1R to Q4R and diodes D1R to D4R. S-phase converter 2Sa includes IGBT elements Q1S to Q4S and diodes D1S to D4S. T-phase converter 2Ta includes IGBT elements Q1T to Q4T and diodes D1T to D4T.

Here, in order to collectively describe the configuration of single-phase converters 2Ra, 2Sa, and 2Ta, reference characters R, S, and T will be collectively designated by a reference character "xa". Further, DC positive buses PL1, PL2, and PL3 will be collectively designated by "PLi", DC negative buses NL1, NL2, and NL3 will be collectively designated by "NLi", and DC neutral point buses CL1, CL2, and CL3 will be collectively designated by "CU".

An IGBT element Q1xa has an emitter connected to an xa-phase line xaL, and a collector connected to a DC positive bus PLi. An IGBT element Q2xa has a collector connected to xa-phase line xaL, and an emitter connected to a DC negative bus NLi. An IGBT element Q3xa has an emitter connected to xa-phase line xaL, and a collector connected to a collector of an IGBT element Q4xa. IGBT element Q4xa has an emitter connected to a DC neutral point bus CLi. Diodes D1xa and D2xa function as reflux diodes, and diodes D3xa and D4xa function as clamp diodes. IGBT elements Q3xa and Q4xa and diodes D3xa and D4xa constitute an AC switch. In this configuration, the DC neutral point buses of the converters are connected in common to DC neutral point bus CL.

Three-phase inverter 3 is configured by connecting U-phase inverter 3U, V-phase inverter 3V, and W-phase inverter 3W shown in FIGS. 1 and 2 in parallel between DC positive bus PL and DC negative bus NL. In this configuration, the DC neutral point buses of the inverters are connected in common to DC neutral point bus CL. It should be noted that operation of three-phase inverter 3 is substantially the same as the operation of single-phase inverters 3U, 3V, and 3W illustrated in FIG. 6. Operation of three-phase converter 2a has an input/output relation opposite to that of the operation of single-phase inverters 3U, 3V, and 3W.

Power conversion device 1000 in accordance with the comparative example further includes fuses F1R to F3R, F1S to F3S, F1T to F3T, F1U to F3U, F1V to F3V, and F1W to F3W. Arrangement of fuses F1R to F3R, F1S to F3S, and F1T to F3T with respect to single-phase converters 2Ra, 2Sa, and 2Ta in power conversion device 1000 is substantially the same as arrangement of fuses FP1 to FN1, FP2 to FN2, and FP3 to FN3 with respect to single-phase inverters 3U, 3V, and 3W in power conversion device 100. Further, arrangement of fuses F1U to F3U, F1V to F3V, and F1W to F3W with respect to single-phase inverters 3U, 3V, and 3W in power conversion device 1000 is substantially the same as the arrangement of fuses FP1 to FN1, FP2 to FN2, and FP3 to FN3 with respect to single-phase inverters 3U, 3V, and 3W in power conversion device 100. In the following, in order to collectively describe the configuration of these fuses, reference characters R, S, T, U, V, and W will be collectively designated by a reference character "z".

A fuse F1z is connected between a collector of an IGBT element Q1z and DC positive bus PL. A fuse F2z is connected between an emitter of an IGBT element Q2z and DC negative bus NL. A fuse F3z is connected between an emitter of an IGBT element Q4z and DC neutral point bus CL.

In power conversion device 1000 in accordance with the comparative example, for example, when IGBT element Q4R has a failure and is short-circuited during a period in which IGBT elements Q1R and Q3S are turned on, a short-circuit current flows through a path from R-phase line RL to S-phase line SL through diode D3R, IGBT element Q4R, fuses F3R and F3S, diode D4S, and TGBT element Q3S, and fuses F3R and F3S are blown. Further, a short-circuit current flows through a path from a positive-side electrode of capacitor C1S to a negative-side electrode of capacitor C1S through fuses F1S and F1R, IGBT element Q1R, diode D3R, IGBT element Q4R, and fuses F3R and F3S, and fuses F1S, FIR, F3R, and F3S are blown.

Thus, also in power conversion device 1000, when an IGBT element has a failure and is short-circuited, fuses are blown and thereby a failed phase is separated from normal phases, preventing flowing of an overcurrent and occurrence of an overvoltage.

On the other hand, arrangement of DC fuses as in power conversion device 1000 has a problem that many fuses are required. Specifically, in power conversion device 1000, nine fuses are used for the three-level inverters and another nine fuses are used for the three-level converters, and thus a total of 18 fuses are used. This may lead to an increase in the size and cost of the power conversion device. Further, when the power conversion device includes many fuses, the total power losses in all the fuses increase during operation of the power conversion device. This may also lead to a reduction in the efficiency of the power conversion device.

To deal with this problem, power conversion device 100 in accordance with the first embodiment adopts a Vienna rectifier, which is a diode rectifier having a neutral point, as a single-phase converter. Here, a short circuit is more likely to occur in an IGBT element due to erroneous switching operation or the like, when compared with a diode. That is, a short circuit is less likely to occur by using a diode rectifier like a Vienna rectifier. More specifically, although a Vienna rectifier is a three-level converter, it includes only one IGBT element, which is more likely to be short-circuited than a diode, and thereby a short circuit is less likely to occur therein. Accordingly, by using a diode rectifier like a Vienna rectifier as a converter, a DC fuse arranged between one terminal of each IGBT element and a DC bus is not required, and DC fuses can be replaced by an AC fuse. Therefore, it is possible to simplify the arrangement and the number of fuses with respect to three-level converters to three AC fuses, as shown in FIGS. 1 to 2. As a result, in power conversion device 100 in accordance with the first embodiment, three fuses for the three-level converters and nine fuses for three-level inverters, and thus a total of 12 fuses can deal with a short circuit of any of switching elements in the power conversion device, and prevent occurrence of an overcurrent or an overvoltage. Thus, according to power conversion device 100 in accordance with the first embodiment, a reduction in the size and cost of the power conversion device can be achieved while suppressing occurrence of an overcurrent or an overvoltage. That is, a power conversion device capable of achieving prevention of an overcurrent and an overvoltage with a simple configuration can be provided.

[First Variation]

Figure 11:
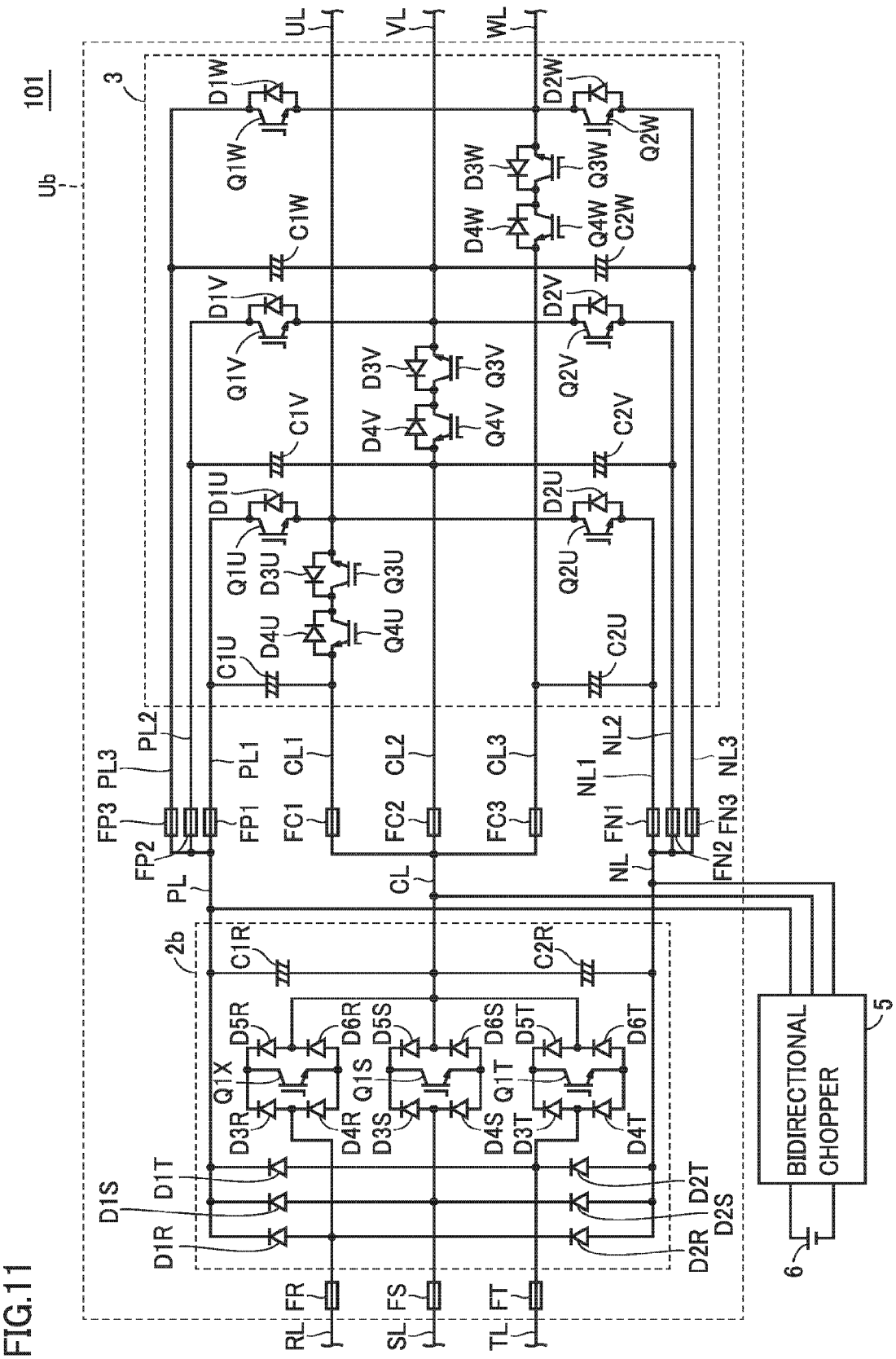
FIG. 11 is a circuit diagram illustrating a configuration of a power conversion device in accordance with a first variation of the first embodiment of the present invention.

FIG. 11 is a circuit diagram illustrating a configuration of a power conversion device 101 in accordance with a first variation of the first embodiment of the present invention. Power conversion device 101 in accordance with the first variation is basically the same as power conversion device 100 in accordance with the first embodiment shown in FIGS. 1 and 2 in the main circuit configuration of converters and inverters and the basic structure constituted of the converters and the inverters, and is different therefrom in the configuration of a converter unit.

Referring to FIG. 11, power conversion device 101 in accordance with the first variation includes one converter unit Ub connected between AC power supply 1 and load 4 (both not shown). Converter unit Ub includes a three-phase converter 2b, three-phase inverter 3, DC positive bus PL, DC negative bus NL, and DC neutral point bus CL.

Three-phase converter 2b is configured by connecting R-phase converter 2R, S-phase converter 2S, and T-phase converter 2T shown in FIGS. 1 and 2 in parallel between DC positive bus PL and DC negative bus NL. In this configuration, the DC neutral point buses of the converters are connected in common to DC neutral point bus CL.

Three-phase inverter 3 is configured by connecting U-phase inverter 3U, V-phase inverter 3V, and W-phase inverter 3W shown in FIGS. 1 and 2 in parallel between DC positive bus PL and DC negative bus NL. In this configuration, the DC neutral point buses of the inverters are connected in common to DC neutral point bus CL. It should be noted that operations of three-phase converter 2b and three-phase inverter 3 are substantially the same as the operations of single-phase converters 2R, 2S, and 2T and single-phase inverters 3U, 3V, and 3W illustrated in FIGS. 3 and 6, respectively.

In power conversion device 101 in accordance with the first variation, the total number, inserted positions, and function of fuses FR, FS, FT, FP1, FP2, FP3, FN1, FN2, FN3, FC1, FC2, and FC3 are the same as those in power conversion device 100 in accordance with the first embodiment.

That is, also in the present variation, when an IGBT element has a failure and is short-circuited in any of the single-phase converters and the single-phase inverters, some of the 12 fuses are blown, and thereby occurrence of an overcurrent or an overvoltage can be prevented. Thus, the present variation can also achieve the same effect as that of the first embodiment. Since other components are the same as those in the first embodiment, the description thereof will not be repeated.

[Second Variation]

In the first embodiment and the first variation thereof described above, single-phase converters 2R, 2S, and 2T are three-level converters, and single-phase inverters 3U, 3V, and 3W are three-level inverters. However, the single-phase converters may be two-level converters, and the single-phase inverters may be two-level inverters.

Figure 12:
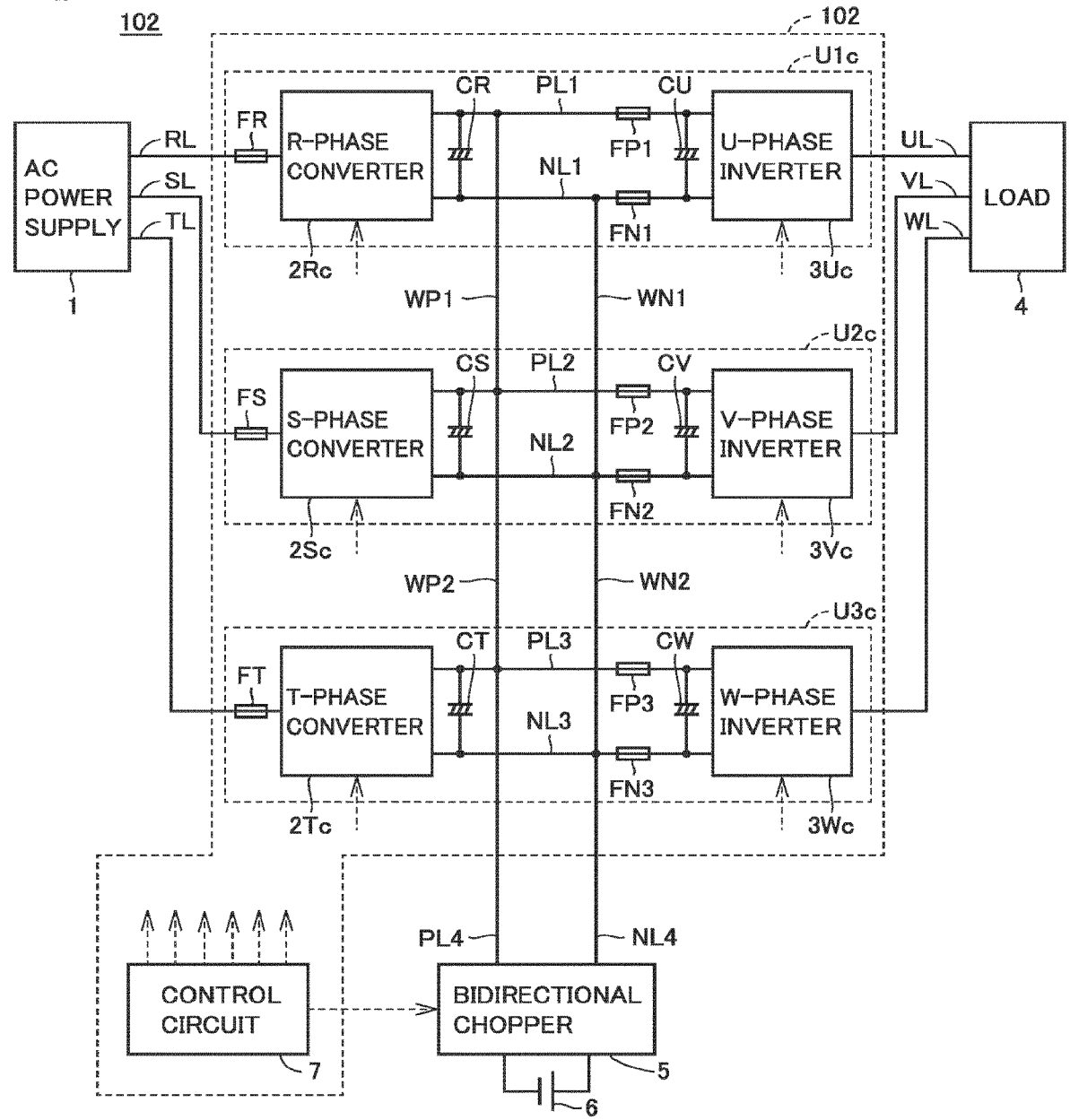
FIG. 12 is a schematic block diagram showing a main circuit configuration of a power conversion device in accordance with a second variation of the first embodiment of the present invention.

FIG. 12 is a circuit diagram illustrating a configuration of a power conversion device 102 in accordance with a second variation of the first embodiment. As shown in FIG. 12, each converter unit is configured to include one two-level converter, one two-level inverter, two DC buses (a DC positive bus and a DC negative bus), and two capacitors connected in parallel between the two DC buses.

Figure 13:
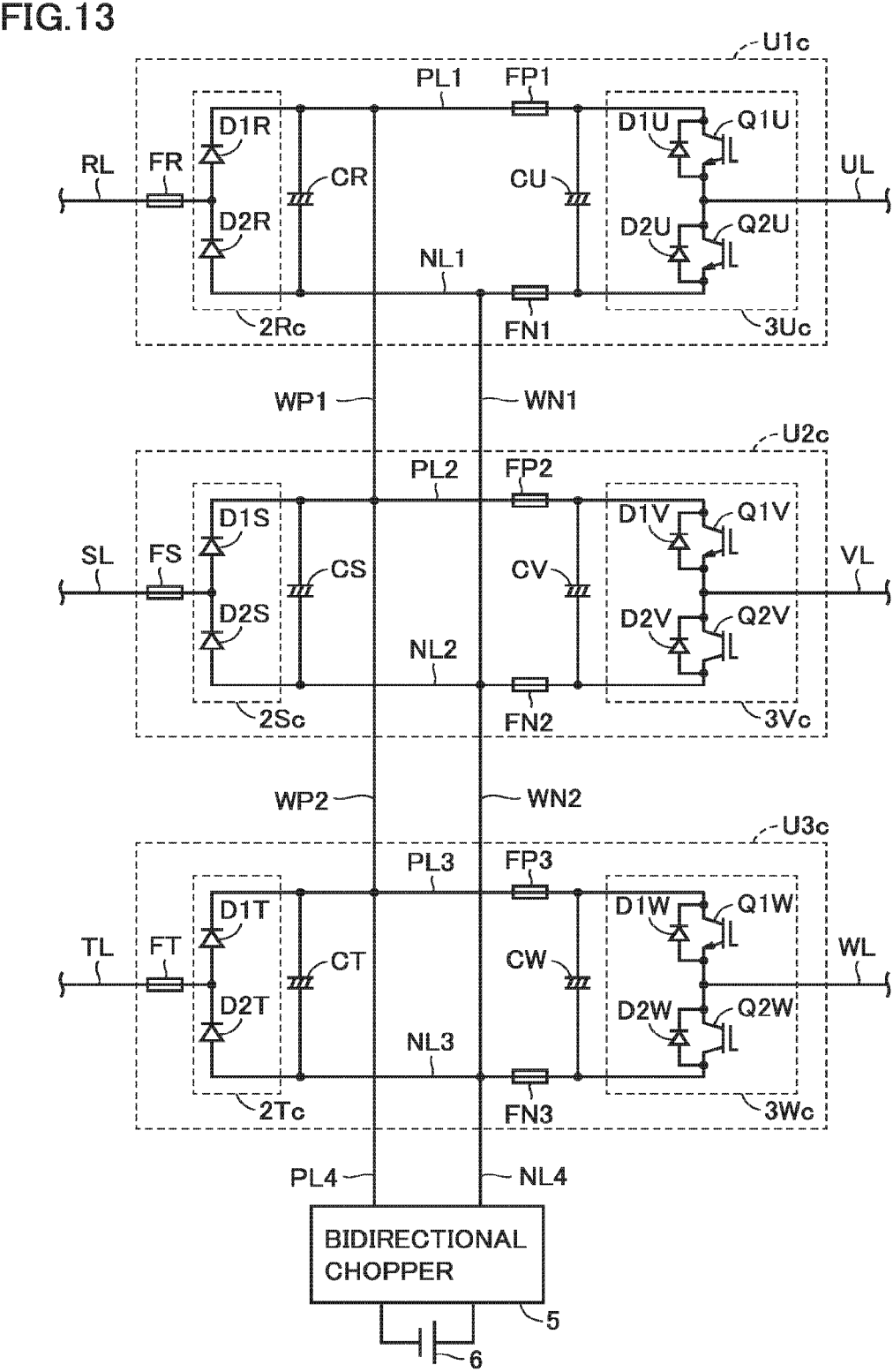
FIG. 13 is a circuit diagram illustrating in detail configurations of single-phase converters and single-phase inverters shown in FIG. 12.

FIG. 13 is a schematic block diagram showing a main circuit configuration of power conversion device 102 in accordance with the second variation of the first embodiment of the present invention. Referring to FIG. 13, R, S, and T-phase converters are so-called diode rectifiers. U, V, and W-phase inverters are two-level inverters, instead of the three-level inverters shown in FIG. 2. Specifically, an R-phase converter 2Rc includes diodes D1R to D2R. An S-phase converter 2Sc includes diodes D1S to D2S. A T-phase converter 2Tc includes diodes D1T to D2T. A U-phase inverter 3Uc includes IGBT elements Q1U to Q2U and diodes D1U to D2U. A V-phase inverter 3Vc includes IGBT elements Q1V to Q2V and diodes D1V to D2V. A W-phase inverter 3Wc includes IGBT elements Q1W to Q2W and diodes D1W to D2W.

In the present variation, each single-phase converter is constituted of diodes only and does not include an IGBT element, which is more likely to be short-circuited than a diode, and thus a short circuit is less likely to occur therein. That is, it is possible to simplify the arrangement and the number of fuses to three AC fuses, as in the first embodiment. As a result, when an IGBT element or a diode has a failure and is short-circuited in any of the single-phase converters and the single-phase inverters, some of nine fuses are blown, and thereby occurrence of an overcurrent or an overvoltage can be prevented. Thus, the present variation can also achieve the same effect as that of the first embodiment. Since other components are the same as those in the first embodiment, the description thereof will not be repeated.

Further, in the embodiment and the variations thereof described above, converter units U1 to U3 correspond to "first to third power converters", respectively, in the present invention. The R-phase converter, the S-phase converter, and the T-phase converter correspond to a "first-phase converter", a "second-phase converter", and a "third-phase converter", respectively, in the present invention, and the U-phase inverter, the V-phase inverter, and the W-phase inverter correspond to a "fourth-phase inverter", a "fifth-phase inverter", and a "sixth-phase inverter", respectively, in the present invention. DC positive buses PL1 to PL4 correspond to "first to fourth DC positive buses", respectively, in the present invention, DC negative buses NL1 to NL4 correspond to "first to fourth DC negative buses", respectively, in the present invention, and DC neutral point buses CL1 to CL4 correspond to "first to fourth DC neutral point buses", respectively, in the present invention.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: AC power supply; 2, 2a, 2b: three-phase converter; 2R, 2Ra, 2Rc, 2S, 2Sa, 2Sc, 2T, 2Ta, 2Tc: single-phase converter; 3: three-phase inverter; 3U, 3Uc, 3V, 3Vc, 3W, 3We: single-phase inverter; 4: load; 5: bidirectional chopper; 6: DC power supply; 7: control circuit; 100, 101, 102, 1000: power conversion device; C1R, C1S, C1T, C1U, C1V, C1W, C2R, C2S, C2T, C2U, C2V, C2W: capacitor; PL1 to PL4: DC positive buses; NL1 to NL4: DC negative buses; CL1 to CL4: DC neutral point buses; D1R to D6R, D1S to D6S, D1T to D6T, D1U to D6U, D1V to D6V, D1W to D6W: diodes; FR, FS, FT, FP1 to FP3, FC1 to FC3, FN1 to FN3, F1R to F3R, F1S to F3S, FIT to F3T, F1U to F3U, F1V to F3V, F1W to F3W: fuses; Q1R to Q4R, Q1S to Q4S, Q1T to Q4T, Q1U to Q4U, Q1V to Q4V, Q1W to Q4W: IGBT elements; RL, SL, TL, UL, VL, WL: phase line; Ua, Ub: converter unit; U1 to U3: first to third converter units; WC1, WC2, WN1, WN2, WP1, WP2: wire.

The invention claimed is:

1. A power conversion device for converting first to third-phase AC voltages supplied from an AC power supply into fourth to sixth-phase AC voltages and supplying the fourth to sixth-phase AC voltages to a load, the power conversion device comprising:
   first to third-phase converters configured to convert the first to third-phase AC voltages into DC voltages, respectively;
   first to third DC positive buses electrically connected to the first to third-phase converters, respectively;
   first to third DC negative buses electrically connected to the first to third-phase converters, respectively;
   a fourth-phase inverter connected between the first DC positive bus and the first DC negative bus, and configured to convert the DC voltage into the fourth-phase AC voltage;
   a fifth-phase inverter connected between the second DC positive bus and the second DC negative bus, and configured to convert the DC voltage into the fifth-phase AC voltage; and
   a sixth-phase inverter connected between the third DC positive bus and the third DC negative bus, and configured to convert the DC voltage into the sixth-phase AC voltage,
   the first to third-phase converters including diode rectifiers,
   the power conversion device further comprising:
   a first fuse connected between the AC power supply and the first-phase converter;
   a second fuse connected between the AC power supply and the second-phase converter;
   a third fuse connected between the AC power supply and the third-phase converter;
   fourth to sixth fuses inserted into the first to third DC positive buses, respectively; and
   seventh to ninth fuses inserted into the first to third DC negative buses, respectively.

2. The power conversion device according to claim 1, wherein
   the first-phase converter, the first DC positive bus, the first DC negative bus, and the fourth-phase inverter constitute a first power converter,
   the second-phase converter, the second DC positive bus, the second DC negative bus, and the fifth-phase inverter constitute a second power converter,
   the third-phase converter, the third DC positive bus, the third DC negative bus, and the sixth-phase inverter constitute a third power converter, and
   the first to third power converters are connected in parallel between the AC power supply and the load.

3. The power conversion device according to claim 1, wherein
   the power conversion device further comprises:
   a fourth DC positive bus to which the first to third DC positive buses are connected in common; and
   a fourth DC negative bus to which the first to third DC negative buses are connected in common, and
   the first to third-phase converters are connected in parallel between the fourth DC positive bus and the fourth DC negative bus.

4. The power conversion device according to claim 1, wherein
   each of the first to third-phase converters is a two-level converter, and
   each of the fourth to sixth-phase inverters is a two-level inverter.

5. The power conversion device according to claim 1, wherein
   each of the first to third-phase converters is a three-level converter,
   each of the fourth to sixth-phase inverters is a three-level inverter,
   the power conversion device further comprises:
   a first DC neutral point bus connected between the first-phase converter and the fourth-phase inverter;
   a second DC neutral point bus connected between the second-phase converter and the fifth-phase inverter;
   a third DC neutral point bus connected between the third-phase converter and the sixth-phase inverter; and
   tenth to twelfth fuses inserted into the first to third DC neutral point buses, respectively, and
   each of the first to third-phase converters has the diode rectifier, and a switching element electrically connected between the AC power supply and each of the first to third DC neutral point buses.

* * * * *